United States Patent
Chou

(10) Patent No.: US 9,690,707 B2
(45) Date of Patent: Jun. 27, 2017

(54) CORRELATION-BASED INSTRUCTION PREFETCHING

(75) Inventor: Yuan C. Chou, Los Gatos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1052 days.

(21) Appl. No.: 12/952,828

(22) Filed: Nov. 23, 2010

(65) Prior Publication Data

US 2012/0131311 A1    May 24, 2012

(51) Int. Cl.
*G06F 9/30*       (2006.01)
*G06F 12/0862*   (2016.01)
*G06F 9/38*       (2006.01)

(52) U.S. Cl.
CPC ........ *G06F 12/0862* (2013.01); *G06F 9/3802* (2013.01); *G06F 9/3806* (2013.01); *G06F 2212/6024* (2013.01)

(58) Field of Classification Search
None
See application file for complete search history.

(56) References Cited

U.S. PATENT DOCUMENTS 6,119,222 A * 9/2000 Shiell et al. ............. 712/238
2011/0238923 A1 * 9/2011 Hooker et al. ........... 711/137

* cited by examiner

*Primary Examiner* — Corey S Faherty
(74) *Attorney, Agent, or Firm* — Park, Vaughan, Fleming & Dowler LLP

(57) ABSTRACT

The disclosed embodiments provide a system that facilitates prefetching an instruction cache line in a processor. During execution of the processor, the system performs a current instruction cache access which is directed to a current cache line. If the current instruction cache access causes a cache miss or is a first demand fetch for a previously prefetched cache line, the system determines whether the current instruction cache access is discontinuous with a preceding instruction cache access. If so, the system completes the current instruction cache access by performing a cache access to service the cache miss or the first demand fetch, and also prefetching a predicted cache line associated with a discontinuous instruction cache access which is predicted to follow the current instruction cache access.

16 Claims, 3 Drawing Sheets

CORRELATION-BASED INSTRUCTION PREFETCHING

BACKGROUND

Field

The disclosed embodiments relate to instruction-prefetching mechanisms in computer processors. More specifically, the disclosed embodiments relate to the design of a correlation-based instruction prefetcher, which uses an outer-level cache (e.g., an L2 cache) to store the correlation keys (instruction miss addresses).

Related Art

For processors running commercial applications, instruction cache misses can significantly degrade system performance. This is because the large instruction working sets of such applications can rapidly overwhelm the processor's first level instruction cache, thereby causing numerous cache misses which can stall the processor's fetch unit. Even processors that use techniques such as chip multi-threading (CMT) to deal with the performance problems caused by cache misses are susceptible to this problem. This is because the large number of threads that share the same instruction cache in such systems cause even higher instruction cache miss rates.

To reduce instruction cache miss rates, processors commonly perform sequential prefetching to prefetch cache lines that sequentially follow a current cache line. Although sequential instruction prefetching is simple to implement and effectively removes instruction cache misses arising from sequential instruction fetches, sequential prefetching is not effective at removing instruction cache misses that arise from large discontinuities in instruction fetch addresses. For example, such large discontinuities are frequently caused by taken branches, jumps, function calls or function returns.

Hence, what is needed is a method and an apparatus for reducing the number of instruction cache misses which are caused by large discontinuities in instruction fetch addresses.

SUMMARY

The disclosed embodiments provide a system that facilitates prefetching an instruction cache line in a processor. During execution of the processor, the system performs a current instruction cache access which is directed to a current cache line. If the current instruction cache access causes a cache miss or is a first demand fetch (an instruction fetch which is not a prefetch) for a previously prefetched cache line, the system determines whether the current instruction cache access is discontinuous with a preceding instruction cache access. If so, the system completes the current instruction cache access by performing a cache access to service the cache miss or the first demand fetch, and also prefetching a predicted cache line associated with a discontinuous instruction cache access which is predicted to follow the current instruction cache access.

In some embodiments, the current instruction cache access is discontinuous with the preceding instruction cache access if a difference between an address for the current cache line and an address for a cache line associated with the preceding instruction cache access exceeds a predetermined threshold.

In some embodiments, prefetching the predicted cache line additionally involves prefetching one or more sequential cache lines following the predicted cache line.

In some embodiments, prefetching the predicted cache line involves: looking up a location for the predicted cache line in a next line table (NLT); and then prefetching the predicted cache line from the location.

In some embodiments, an NLT entry which contains the location for the predicted cache line is stored in an outer-level cache which is set-associative. In these embodiments, the NLT entry is associated with the same tag in the outer-level cache as the current cache line, whereby a lookup to service a cache miss for the current instruction cache access can return the NLT entry as well as the current cache line.

In some embodiments, the outer-level cache is an L2 cache or an L3 cache.

In some embodiments, the location for the predicted cache line comprises a set value and a way value which collectively specify a location in the outer-level cache for the predicted cache line.

In some embodiments, each set in the outer-level cache is associated with: a set of tags; a set of corresponding data array locations; and a set of NLT entries, wherein each tag in the set of tags can be associated with an NLT entry in the set of NLT entries.

In some embodiments, if the current instruction cache access is discontinuous, completing the current instruction cache access additionally involves storing a location for the current cache line in an NLT entry associated with a preceding discontinuous instruction cache access, whereby a subsequent discontinuous access to a cache line associated with the preceding discontinuous instruction cache access can trigger a prefetch for the current cache line.

DETAILED DESCRIPTION

Figure 1:
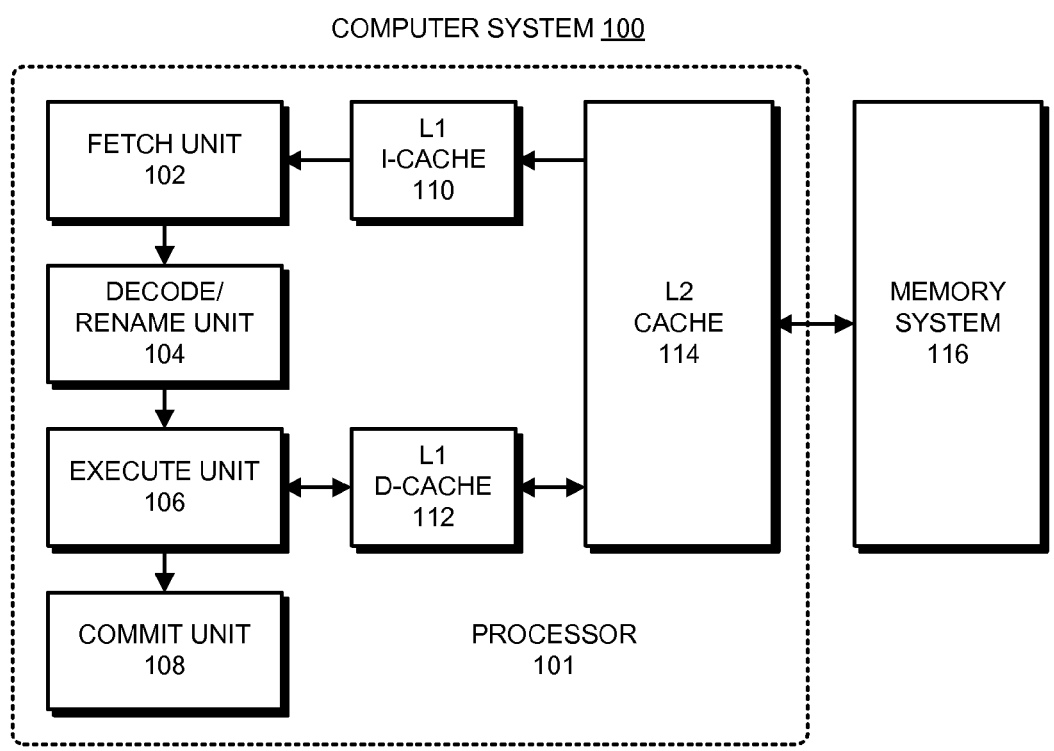
FIG. 1 illustrates a computer system in accordance with the disclosed embodiments.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to the design of a cost-effective correlation-based instruction prefetcher. While sequential instruction prefetching is inexpensive to implement and effective for removing instruction cache misses arising from contiguous instruction fetch addresses, it is ineffective for removing instruction cache misses that arise from large discontinuities in fetch addresses. Existing correlation-based instruction prefetchers can effectively remove the latter category of instruction cache misses, but they are traditionally very expensive to implement.

The present invention is based on two observations. The first observation is that instruction accesses tend to miss the first level instruction cache, but they almost never miss in a large outer-level cache (such as an L2 cache or an L3 cache). The second observation is that a major overhead of correlation-based instruction prefetchers is the cost of storing the correlation keys (e.g., instruction miss addresses), and this overhead can be avoided if we use the existing tags and related structures in the large outer-level cache.

For clarity, our subsequent descriptions assume that the processor has a small first-level L1 instruction cache, a large second-level L2 cache and no third-level L3 cache. However, the present invention can easily be modified to work in a processor that has a small L1 instruction cache, a relatively small L2 cache and a large L3 cache.

The present invention operates by remembering which next discontinuous L2 instruction cache line is usually accessed after a current L2 instruction cache line is accessed. The system then attempts to prefetch that next L2 instruction line (and optionally the next few sequential lines after it) before the next instruction line is needed. To do so, the tag array in the L2 cache is augmented with extra information to indicate: (1) which lines in the set contain instructions and should trigger instruction prefetches when accessed, and (2) for those lines, the address of the next discontinuous L2 instruction line to prefetch. Unlike conventional correlation-based instruction prefetchers, the present invention uses the existing tags in the L2 cache as the correlation keys, thereby greatly reducing storage requirements. As noted above, storage space for correlation keys comprises a large proportion of the storage requirements for correlation-based prefetchers.

We describe the present invention in more detail below, but first we describe a computer system in which the invention operates.

Computer System

FIG. 1 illustrates a computer system 100 in accordance with the disclosed embodiments. Computer system 100 can generally include any type of computer system, including, but not limited to, a computer system based on a microprocessor, such as a server, a desktop computer, a digital signal processor, a laptop computer, a notebook computer, a tablet computer, a personal digital assistant, a cell phone, a device controller, or a computational engine within an appliance. Computer system 100 includes a processor 101 and a memory system 116. Memory system 116 can include a main memory and possibly an L3 or an L4 cache.

Processor 101 includes an execution pipeline comprising a fetch unit 102, a decode/rename unit 104, an execute unit 106 and a commit unit 108. During system operation, fetch unit 102 retrieves an instruction from level-one (L1) instruction cache (I-cache) 110. This instruction feeds through decode/rename unit 104 which decodes the instruction and performs register renaming operations to identify the relevant operands for the instruction. Next, the decoded instruction feeds into execute unit 106, which executes the instruction, wherein executing the instruction can involve operating on data words stored in L1 data cache (D-cache) 112. Finally, the instruction feeds into commit unit 108, which commits results produced during execution of the instruction.

Note that L1 I-cache 110 and L1 D-cache 112 both access a unified L2 cache 114, which stores both instruction cache lines and data cache lines. L2 cache 114, in turn, communicates with memory system 116. Note that L2 cache 114 includes an integrated next line table (NLT) which facilitates predicting cache lines to prefetch as is described in more detail below.

Although the present invention is described in the context of the specific computer system illustrated in FIG. 1, the present invention can generally be used in any type of computer system which includes an instruction cache, including multi-core processor systems.

L2 Cache

Figure 2A:
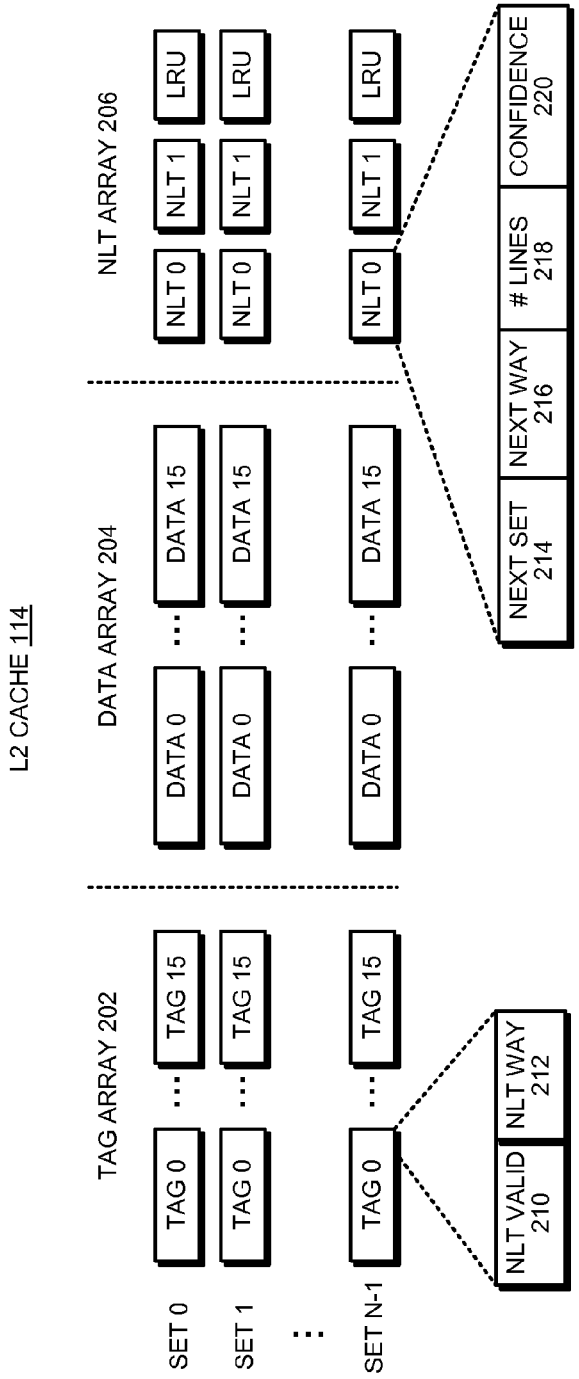
FIG. 2A illustrates the structure of an L2 cache which incorporates an NLT in accordance with the disclosed embodiments.

FIG. 2A illustrates the structure of an L2 cache 114 which incorporates an NLT in accordance with the disclosed embodiments. Like a conventional cache, L2 cache 114 includes (1) a tag array 202 containing address tags for cache lines, and (2) a data array 204 containing the associated data for the cache lines. However, unlike a conventional cache, L2 cache 114 includes an NLT array 206 containing entries which reference cache lines to be prefetched. Note that, if L2 cache 114 is physically banked, the NLT can be physically distributed across the cache banks. Also note that L2 cache 114 is a 16-way set-associative cache, wherein tag array 202, data array 204 and NLT array 206 are divided into N sets, from set 0 to set N−1. For each of these sets, tag array 202 and data array 204 each include 16 entries associated with each of the 16 "ways." Hence, each cache line in L2 cache 114 can be indexed by a "set value" and a "way value."

NLT array 206 includes a number of NLT entries for each set. However, this number is less than 16 because the majority of the cache lines in a given set will be data cache lines, which do not require associated NLT entries. Also, only the instruction cache lines associated with discontinuous (non-sequential) instruction accesses will require associated NLT entries. Hence, in practice only a fraction of the 16 cache lines in a set will require associated NLT entries. Hence, in the disclosed embodiment, NLT array 206 includes two NLT entries for each set. In addition, each set in NLT array 206 also contains LRU information which can be used to facilitate a replacement policy for the NLT entries in each set.

As illustrated in FIG. 2A, each tag in L2 cache 114 is augmented to include (1) an NLT valid indicator 210, and (2) an NLT way indicator 212. For a given tag in a given set, the NLT valid indicator 210 indicates whether the associated cache line has a corresponding NLT entry in the given set. If so, the NLT way indicator 212 specifies the "way location" for the associated NLT entry in the given set. In the example illustrated in FIG. 2A, there are two NLT entries and hence two NLT ways for each set, so the NLT way indicator 212 includes only a single bit which indicates whether the NLT entry is located in NLT way 0 or NLT way 1.

As illustrated in FIG. 2A, each NLT entry includes a number of fields including next set 214, next way 216, number of lines 218 and a confidence value 220. The next set 214 value and next way 216 value collectively specify a location in the L2 cache for a line to be prefetched. Note that storing the set and way values instead of saving the address for the cache line to be prefetched saves a considerable amount of space. For example, if the L2 cache has 8192 sets and 16 ways, the NLT set field requires 13 bits and the NLT way field requires 4 bits for a total of 17 bits, which is a fraction of the size of the corresponding 64-bit address (less offset bits) for the next cache line. Moreover, prefetching based on set and way values will be faster, because much of the address decoding process is avoided.

The number of lines 218 field is an optional field which specifies the number of sequential cache lines that should be prefetched, and the confidence value 220 is also an optional field which indicates a confidence that the predicted cache line will be accessed, wherein the predicted cache line will be prefetched only if the confidence value exceeds a threshold. The number of lines 218 and the confidence value 220 are described in more detail below.

Registers

Figure 2B:
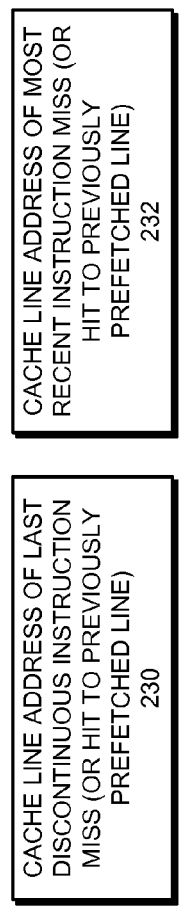
FIG. 2B illustrates registers used by the processor in the computer system to keep track of cache lines associated with discontinuous accesses in accordance with the disclosed embodiments.

FIG. 2B illustrates two registers that the processor uses to keep track of cache lines associated with discontinuous accesses in accordance with the disclosed embodiments. More specifically, the processor uses a first register 230 to keep track of the cache line address for the last discontinuous instruction miss (or hit to a previously prefetched line). The processor also uses a second register 232 to keep track of the cache line address of the most-recent instruction miss (or hit to a previously prefetched cache line). The use of these registers will be discussed in more detail below.

Prefetching Process

We now describe how the NLT which is integrated into the L2 cache is updated, and how it is used to generate instruction prefetches for two different embodiments of the present invention.

First Embodiment

In the first embodiment illustrated in FIG. 2B, the processor keeps track of the following information: (1) the cache line address of the last discontinuous instruction miss or hit to a previously prefetched line (register 230 in FIG. 2B), and (2) the cache line address of the most-recent instruction miss or hit to a previously prefetched line (register 232 in FIG. 2B).

Consider the following exemplary sequence of instruction miss cache line addresses:

X, X+1, X+2, Y, Y+1, Y+2

In this example, the cache line address of the last discontinuous instruction miss is Y, and the cache line address of the most-recent instruction miss is Y+2. When the processor core encounters a primary instruction miss or the first demand fetch of a previously prefetched instruction cache line (henceforth, for convenience, both cases are simply referred to as a "miss"), it compares the cache line address to the cache line address of the most-recent L1 instruction cache miss. If the new miss is contiguous (i.e., the cache line addresses differs by less than some predetermined threshold), the most-recent instruction miss register is updated to the new cache line address. In addition, if the new miss is a demand fetch of a previously prefetched instruction cache line, sequential prefetches of prefetch distance M and prefetch degree N (where M and N are design parameters) may be generated. If the miss is not contiguous (i.e., the cache line address differs by greater than some predetermined threshold), the NLT is updated as follows.

Consider the following exemplary sequence of instruction miss cache line addresses:

X, X+1, X+2, Y, Y+1, Y+2, Z

In this example, when the processor core encounters the discontinuous miss Z, the cache line address of the last discontinuous instruction miss is Y, and the cache line address of the most-recent instruction miss is Y+2. In this case, the processor core sends a request update_NLT(Y, Z) to the L2 cache. The L2 cache and the NLT both use address Y to select the cache set and the NLT set respectively. The L2 cache then compares Y to the cache tags of the selected set. If there is a match, the matching tag (which has been augmented with a few bits to indicate which NLT way (if any) that line is mapped to) is examined to determine the NLT way. If the cache tag for line Y indicates that an NLT way has not yet been assigned for this line, an NLT way is allocated by applying an NLT replacement strategy (e.g., LRU) and the allocated NLT entry is updated to indicate that cache line Z should be prefetched after cache line Y is accessed. At this point, the optional confidence counter can be initialized. If the cache tag for line Y indicates that an NLT way has already been assigned for the line, the associated NLT entry is updated to indicate that cache line Z should be prefetched after cache line Y is accessed. At this point, the optional confidence counter can be incremented, decremented or reset depending on whether the NLT entry previously also indicated that cache line Z should be prefetched after cache line Y is accessed.

In addition to sending the request update_NLT(Y, Z), the processor also sends a request prefetch_NLT(Z) to the L2 cache (this request can be piggy-backed on the processor core's request to fetch line Z). The L2 cache and the NLT both use Z to select the cache set and the NLT set respectively. Then the L2 cache compares Z to the cache tags of the selected set. If there is a match, the matching tag is examined to determine the NLT way. The information from the selected NLT entry is then used to generate and issue a prefetch request. Optionally, the prefetch request is only issued if the confidence counter of the NLT entry exceeds a predetermined threshold. In addition to this prefetch request, a prefetch request of the next N sequential lines (where N is a design parameter) may also be issued.

Lastly, in the processor core, the most-recent instruction miss register and the last discontinuous instruction miss register are both updated with the new cache line address.

Second Embodiment

We now describe how the NLT is updated and how it is used to generate instruction prefetches for a second embodiment of the present invention. In this embodiment, the processor core keeps track of the following information: (1) a cache line address of the last two discontinuous instruction misses (or hits to previously prefetched lines), (2) a cache line address of the most-recent instruction miss (or hit to a previously prefetched line), and (3) the number of contiguous cache lines succeeding the last discontinuous instruction miss. This information is held in special registers. Consider the following exemplary sequence of instruction miss cache line addresses.

X, X+1, X+2, Y, Y+1, Y+2

In this example, the cache line address of the last discontinuous instruction miss is Y, the cache line address of the second-to-last discontinuous instruction miss is X, and the cache line address of the most-recent instruction miss is Y+2.

When the processor core encounters a primary instruction miss or the first demand fetch of a previously prefetched instruction cache line (henceforth both cases are simply referred to as a "miss" for convenience), the processor compares the cache line address to the cache line address of the most-recent L1 instruction cache miss. If the new miss is contiguous, the cache line address of the most-recent instruction miss is updated to the new cache line address, and the number of contiguous lines succeeding the last instruction miss is incremented by one. In addition, if the new miss is a demand fetch of a previously prefetched instruction cache line, sequential prefetches of prefetch distance M and prefetch degree N (where M and N are design parameters) may be generated. If the miss is not contiguous, the NLT is updated as follows.

Consider the following exemplary sequence of instruction miss cache line addresses.

X, X+1, X+2, Y, Y+1, Y+2, Z

In this example, at the point that the processor core encounters the discontinuous miss Z, the cache line address of the last discontinuous instruction miss is Y, the cache line address of the second-to-last discontinuous instruction miss is X, and the cache line address of the most-recent instruction miss is Y+2. Moreover, the number of contiguous lines succeeding the last discontinuous instruction miss Y is 2. The processor core sends the request update_NLT(X,Y,2) to the L2 cache. The L2 cache and the NLT both use X to select the cache set and the NLT set respectively. Then the L2 cache compares X to the cache tags of the selected set. If there is a match, the matching tag (which has been augmented with a few bits to indicate which NLT way (if any) that line is mapped to) is examined to determine the NLT way. If the cache tag for line X indicates that an NLT way has not yet been assigned for the line, an NLT way is allocated by applying the NLT replacement strategy (e.g., LRU), and the allocated NLT entry is updated to indicate that cache line Y should be prefetched after cache line X is accessed, and that the number of sequential cache lines prefetched after Y should be 2. At this point, the optional confidence counter can be initialized. If the cache tag for line X indicates that an NLT way has already been assigned for this line, that NLT entry is updated to indicate that cache line Y should be prefetched after cache line is X accessed, and that the number of sequential cache lines prefetched after Y should be 2. At this point, the optional confidence counter can be incremented, decremented or reset depending on whether the NLT entry previously also indicated that cache line Y should be prefetched after cache line X is accessed.

In addition to sending the request update_NLT(X,Y,2), the processor core also sends a request prefetch_NLT(Z) to the L2 cache (this request can be piggy-backed on the processor core's request to fetch line Z). The L2 cache and the NLT both use Z to select the cache set and the NLT set respectively. The L2 cache compares Z to the cache tags of the selected set. If there is a match, the matching tag is examined to determine the NLT way. The information from the selected NLT entry is then used to generate and issue a prefetch request. Optionally, the prefetch request is only issued if the confidence counter of the NLT entry exceeds a predetermined threshold. In addition to this prefetch request, a sequential prefetch of the subsequent N lines (where N is obtained from the selected NLT entry) is also issued.

Lastly, in the processor core, the most-recent instruction miss register is updated with the new cache line address, the value of the last discontinuous instruction miss register is copied to the second last discontinuous instruction miss register, and the last discontinuous instruction miss register is updated with the new cache line address. Also, the number of contiguous lines succeeding the last discontinuous instruction miss register is reset to zero.

In some embodiments of the present invention, prefetching from the NLT is augmented with prefetching from the processor core's return address stack (RAS). For discontinuities in the instruction cache miss addresses that arise from function call returns, the NLT may be ineffective if the function is called from multiple call sites, because the NLT effectively only remembers the most-recent return address. Therefore, for function call returns, it may be more effective to prefetch from the RAS rather than from the NLT. In one embodiment, whenever the processor core's fetch unit encounters a function call return and pops off the top RAS entry to predict the return address, the next RAS entry is used to generate the address of an instruction prefetch request. In addition, the next few sequential cache lines may also be prefetched. These prefetched lines may then be placed in an instruction prefetch buffer (searched/accessed in parallel with the instruction cache) rather than in the instruction cache itself. This is because these lines may not be needed if the application program subsequently makes another function call instead of a function call return. To avoid potential cache pollution, it is better for the prefetched lines to be placed in an instruction prefetch buffer. If the lines are demand accessed in the instruction prefetch buffer, they can then be copied to the instruction cache. Note that a new set of prefetches into the instruction prefetch buffer replaces the existing contents of the instruction prefetch buffer.

Figure 3:
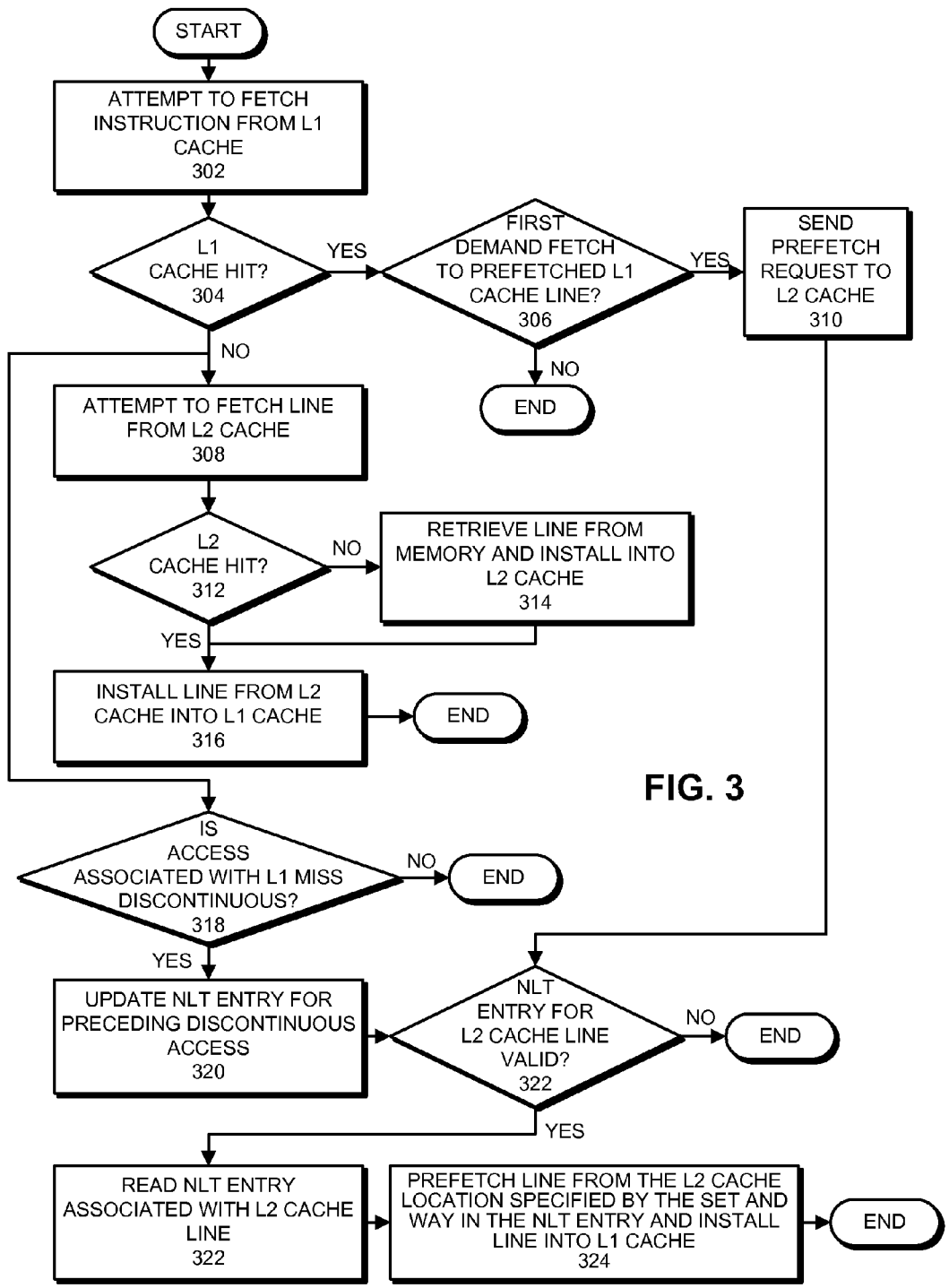
FIG. 3 presents a flow chart illustrating how prefetching takes place during an instruction cache access in accordance with the disclosed embodiments.

To summarize, FIG. 3 presents a flow chart illustrating the prefetching process during an instruction cache access in accordance with the disclosed embodiments. At the start of this process, the system attempts to fetch an instruction from the L1 cache (step 302). Next, the system determines whether the fetch generates a cache hit (step 304). If so, the system determines whether the access is a first demand fetch for a previously prefetched L1 cache line (step 306). If not, the process is complete. On the other hand, if the access is a first demand fetch to a previously prefetched line, the system sends a prefetch request to the L2 cache (step 310). (The processing of this prefetch request is discussed in more detail below with reference to step 322.)

On the other hand, if the L1 cache access at step 304 generated a cache miss, the system (1) fetches the cache line from the L2 cache into the L1 cache and also (2) generates a prefetch if necessary. More specifically, in step (1), fetching the cache line from the L2 cache involves first attempting to fetch the line from the L2 cache (step 308). Next, the system determines whether the fetch generates a cache hit (step 312). If not, the system retrieves the line from memory (or an L3 cache) and installs the retrieved line into the L2 cache (step 314). Next, after the line is installed into the L2 cache, or if the access to the L2 cache generated a hit in step 312, the system installs the fetched line cache into the L1 cache (step 316). At this point, the process of fetching the line from the L2 cache is complete.

We now describe step (2), the process of generating a prefetch if necessary. Sometime after the access was determined to be a cache miss in step 304, the system determines whether the access associated with the L1 cache miss is discontinuous (step 318). As mentioned above, the access to the current cache line is discontinuous with a preceding instruction cache access if a difference between an address for the current cache line and an address for a cache line associated with the preceding instruction cache access exceeds a predetermined threshold. If the access is determined not to be discontinuous at step 318, the system does not perform the prefetch.

Otherwise, if the access is determined to be discontinuous at step 318, the system updates an NLT entry for a preceding discontinuous access so that a subsequent discontinuous access to the same cache line as the preceding discontinuous access causes a prefetch of the current cache line (step 320). Note that this NLT-updating process is described in more detail above.

Next, after the entry for the preceding discontinuous access is updated, or after the prefetch request is sent in step 310, the system determines whether the NLT entry associated with the current cache line in the L2 cache is valid (step 322). As mentioned above, this involves examining the NLT valid bit in the associated L2 tag for the cache line. If the NLT entry is not valid, no prefetch is issued and the process is complete. Otherwise, if the NLT entry is valid, the system reads the NLT entry associated with the L2 cache line (step 322). As mentioned above, this involves reading the NLT entry pointed to by the NLT way field in the associated cache line tag. Finally, the system prefetches the line from the L2 cache location specified by the NLT entry and installs the prefetched L2 cache line into the L1 cache (step 324).

Estimated Storage Requirements

The extra storage required to accommodate the NLT in the L2 cache can be estimated as follows. Assume that the L2 cache is 8 MB, 16-way set-associative, with a 64 B line size. Also assume the NLT is 2-way set-associative, the next cache line address field in each NLT entry is encoded as a 13-bit set value and a 4-bit way value for a total of 17 bits, and the LRU information in each NLT set is encoded using 6 bits.

Number of NLT sets=8*1024*1024/(16*64)=8192
Number of NLT entries=8192*2=16384
NLT storage 8192*6+16384*17=40 KB
Extra L2 tag storage requirements=8192*2 bits=2 KB
As can be seen, the storage required for the NLT information is 40 KB+2 KB=42 KB, which is very small compared to the total 8 MB size of the L2 cache.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for prefetching an instruction cache line, comprising:
    during execution in a processor in a computer system, performing a current instruction cache access which is directed to a current cache line;
    if the current instruction cache access causes a cache miss or is a first demand fetch for a previously prefetched cache line, determining whether the current instruction cache access is discontinuous with a preceding instruction cache access, wherein the current instruction cache access is discontinuous with the preceding instruction cache access if a difference between an address for the current cache line and an address for a cache line associated with the preceding instruction cache access exceeds a predetermined threshold that is greater than or equal to 1; and
    if the current instruction cache access is discontinuous, completing the current instruction cache access by:
    performing a cache access to service the cache miss or the first demand fetch; and using location data for a predicted cache line associated with a discontinuous instruction cache access which is predicted to follow the current instruction cache access to prefetch the predicted cache line,
    wherein using the location data comprises using a set value and a way value which collectively specify a location in an outer-level cache for the predicted cache line, and wherein a next line table (NLT) stores the set value and the way value as the location for the predicted cache line instead of saving an address for the predicted cache line in the outer-level cache; and
    wherein an NLT entry which contains the location data is stored in the outer-level cache, wherein the outer-level cache is set-associative, wherein the NLT entry is associated with the same tag in the outer-level cache as the current cache line, and whereby a lookup to service a cache miss for the current instruction cache access can return the NLT entry as well as the current cache line.

2. The method of claim 1, wherein prefetching the predicted cache line additionally involves prefetching one or more sequential cache lines following the predicted cache line.

3. The method of claim 1, wherein the outer-level cache is an L2 cache or an L3 cache.

4. The method of claim 1, wherein each set in the outer-level cache is associated with:
    a set of tags;
    a set of corresponding data array locations; and
    a set of NLT entries, wherein each tag in the set of tags can be associated with an NLT entry in the set of NLT entries, wherein each tag is augmented to include an NLT valid indicator and an NLT way indicator, and wherein the NLT entry includes a next set, a next way, number of lines and a confidence value.

5. The method of claim 1, wherein if the current instruction cache access is discontinuous, completing the current instruction cache access additionally involves storing a location for the current cache line in an NLT entry associated with a preceding discontinuous instruction cache access, whereby a subsequent discontinuous access to a cache line associated with the preceding discontinuous instruction cache access can trigger a prefetch for the current cache line.

6. An apparatus that facilitates prefetching an instruction cache line, comprising:
    an outer-level cache containing cache lines, which can be instruction cache lines or data cache lines; and
    a next line table (NLT) containing locations for predicted cache lines, wherein a predicted cache line is associated with a discontinuous instruction cache access and is predicted to follow a current discontinuous instruction cache access, wherein a current instruction cache access is discontinuous with a preceding instruction cache access if a difference between an address for a cache line associated with the current instruction cache access and an address for a cache line associated with the preceding instruction cache access exceeds a predetermined threshold, wherein the predetermined threshold is greater than or equal to 1;

wherein the NLT is integrated into the outer-level cache so that a lookup for a current cache line in the outer-level cache can return a location for an associated predicted cache line to facilitate a prefetch for the predicted cache line, wherein the apparatus is configured to, if a current instruction cache access is discontinuous with a preceding instruction cache access, complete the current instruction cache access by, performing a cache access to service the cache miss or the first demand fetch, and prefetching a predicted cache line associated with a discontinuous instruction cache access which is predicted to follow the current instruction cache access, and wherein the outer-level cache comprises a tag array containing tags for cache lines and an NLT array containing NLT entries, wherein each tag in the tag array can be associated with an NLT entry in the NLT array, and wherein the NLT entry includes a next set and a next way.

7. The apparatus of claim 6, wherein a discontinuous instruction cache access is an instruction cache access which is not sequential with a preceding instruction cache access.

8. The apparatus of claim 6, wherein the outer-level cache is an L2 cache or an L3 cache.

9. The apparatus of claim 6, wherein the apparatus is configured to:

determine whether the current instruction cache access is discontinuous with the preceding instruction cache access.

10. The apparatus of claim 9, wherein while prefetching the predicted cache line, the apparatus is additionally configured to prefetch one or more sequential cache lines following the predicted cache line.

11. The apparatus of claim 9, wherein while prefetching the predicted cache line, the apparatus is configured to:

look up a location for the predicted cache line in the NLT; and use the location to prefetch the predicted cache line.

12. The apparatus of claim 11, wherein the location in the NLT entry comprises a set value and a way value which collectively specify a location in the outer-level cache for the predicted cache line, wherein the NLT entry stores the set value and the way value as the location of the predicted cache line instead of saving an address for the predicted cache line in the outer-level cache.

13. The apparatus of claim 9, wherein while completing the current instruction cache access, the apparatus is additionally configured to store a location for the current cache line in an NLT entry associated with a preceding discontinuous instruction cache access, whereby a subsequent discontinuous access to a cache line associated with the preceding discontinuous instruction cache access can trigger a prefetch for the current cache line.

14. The apparatus of claim 9, wherein the outer-level cache comprises a data array containing corresponding data array locations associated with tags in the tag array, wherein each tag is augmented to include an NLT valid indicator and an NLT way indicator, and wherein the NLT entry includes a number of lines and a confidence value.

15. The apparatus of claim 14, wherein each NLT entry comprises:

a set value and a way value which collectively specify a location in the outer-level cache for the predicted cache line;

an optional confidence value which indicates a confidence that the predicted cache line will be accessed, wherein the predicted cache line will be prefetched only if the confidence value exceeds a threshold, wherein the predetermined threshold is greater than or equal to 1; and an optional number of sequential cache lines, which indicates how many sequential cache lines should be prefetched after the predicted cache line.

16. A computer system, comprising:

a processor;

a memory;

an outer-level cache containing cache lines, which can be instruction cache lines or data cache lines; and a next line table (NLT) in the outer-level cache, containing locations for predicted cache lines, wherein a predicted cache line is associated with a discontinuous instruction cache access and is predicted to follow a current discontinuous instruction cache access, wherein a current instruction cache access is discontinuous with a preceding instruction cache access if a difference between an address for a cache line associated with the current instruction cache access and an address for a cache line associated with the preceding instruction cache access exceeds a predetermined threshold that is greater than or equal to 1;

wherein the computer system is configured to, in response to a lookup for a current cache line in the outer-level cache, prefetch a predicted cache line associated with the current cache line by using a set value and a way value which collectively specify a location in the outer-level cache for the predicted cache line, wherein the NLT stores the set value and the way value as the location line instead of saving an address for the predicted cache line in the outer-level cache; and wherein the outer-level cache is set-associative, wherein the NLT entry is associated with the same tag in the outer-level cache as the current cache line, and whereby a lookup to service a cache miss for the current instruction cache access can return the NLT entry as well as the current cache line.

\* \* \* \* \*

UNITED STATES PATENT AND TRADEMARK OFFICE
CERTIFICATE OF CORRECTION

PATENT NO. : 9,690,707 B2
APPLICATION NO. : 12/952828
DATED : June 27, 2017
INVENTOR(S) : Chou It is certified that error appears in the above-identified patent and that said Letters Patent is hereby corrected as shown below:

In the Claims

In Column 12, Line 5, in Claim 14, delete "comprises" insert -- comprises: --, therefor.

Signed and Sealed this
Twentieth Day of February, 2018

Andrei Iancu
*Director of the United States Patent and Trademark Office*